(12) United States Patent
Correia

(10) Patent No.: US 6,231,307 B1
(45) Date of Patent: May 15, 2001

(54) IMPINGEMENT COOLED AIRFOIL TIP

(75) Inventor: Victor H. S. Correia, Milton Mills, NH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/323,329

(22) Filed: Jun. 1, 1999

(51) Int. Cl.$^7$ ................................ F01D 5/18; F01D 5/20
(52) U.S. Cl. .................... 416/97 R; 416/92; 415/115
(58) Field of Search .............................. 416/97 R, 92, 416/96 R, 228, 95, 96 A, 97 A; 415/115, 173.1; 29/889.7, 889.72, 889.721

(56) References Cited

U.S. PATENT DOCUMENTS

| | | | |
|---|---|---|---|
| 3,626,568 | * 12/1971 | Siverstein et al. | 29/889.72 |
| 3,899,267 | * 8/1975 | Dennis et al. | 416/92 |
| 4,142,824 | 3/1979 | Andersen | 415/115 |
| 4,893,987 | 1/1990 | Lee et al. | 416/92 |
| 5,564,902 | * 10/1996 | Tomita | 416/97 R |
| 5,733,102 | * 3/1998 | Lee et al. | 416/97 R |
| 5,864,949 | * 2/1999 | Kildea | 416/95 |
| 5,902,093 | * 5/1999 | Liotta et al. | 416/97 R |

* cited by examiner

Primary Examiner—F. Daniel Lopez
Assistant Examiner—Richard Woo
(74) Attorney, Agent, or Firm—Andrew C. Hess; Rodney M. Young

(57) ABSTRACT

A turbine airfoil includes pressure and suction sidewalls joined together at leading and trailing edges, and extending from root to tip. The tip includes a tip rib extending from a tip cap enclosing an internal flow channel between the sidewalls. An aligned pair of first and second holes extend through the tip cap and rib, respectively, for discharging coolant from the flow channel.

20 Claims, 3 Drawing Sheets

IMPINGEMENT COOLED AIRFOIL TIP

The U.S. Government may have certain rights in this invention in accordance with Contract No. N00019-96-C-0080 awarded by the Dept. of the Navy.

BACKGROUND OF THE INVENTION

The present invention relates generally to gas turbine engines, and, more specifically, to turbine blade cooling.

In a gas turbine engine, air is pressurized in a compressor and mixed with fuel and ignited in a combustor for generating hot combustion gases. The gases flow through turbine stages which extract energy therefrom for powering the compressor and producing useful work, such as powering a fan for propelling an aircraft in flight.

A turbine stage includes a row of turbine blades extending radially outwardly from a supporting rotor disk. Each blade includes an airfoil over which the combustion gases flow for extracting energy therefrom. The airfoil is hollow and is provided with air bled from the compressor for use as a coolant in cooling the blade during operation.

Maximum efficiency of the turbine is obtained by closely positioning the radially outer tip of the airfoil adjacent a surrounding stationary turbine shroud for minimizing combustion gas leakage therebetween. However, differential thermal expansion and contraction between the blade tips and turbine shroud can cause rubbing therebetween. To accommodate this rubbing, the tip of the airfoil includes a squealer tip rib around its perimeter extending outwardly from a tip cap enclosing a coolant flow channel inside the airfoil. The squealer rib may be closely positioned adjacent the shroud and limits rubbing therebetween to the surface area of the rib itself.

However, the squealer rib is thusly exposed on three sides to the hot combustion gases and is difficult to cool, and correspondingly affects useful blade life. The airfoil tip is typically cooled by providing tip holes through the tip cap which discharge a portion of the coolant into the tip cavity defined above the tip cap. And, inclined film cooling holes may extend through the concave or pressure sidewall of the airfoil just below the tip cap to provide film cooling air which bathes the pressure side portion of the tip with film cooling air. However, this form of tip cooling is limited in effectiveness.

Accordingly, it is desired to provide a turbine blade having improved airfoil tip cooling.

BRIEF SUMMARY OF THE INVENTION

A turbine airfoil includes pressure and suction sidewalls joined together at leading and trailing edges, and extending from root to tip. The tip includes a tip rib extending from a tip cap enclosing an internal flow channel between the sidewalls. An aligned pair of first and second holes extend through the tip cap and rib, respectively, for discharging coolant from the flow channel.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 4 is a cross sectional view through the tip rib illustrated in

FIG. 3 and taken along line 4—4 showing a plugged hole therein.

DETAILED DESCRIPTION OF THE INVENTION

Figure 1:
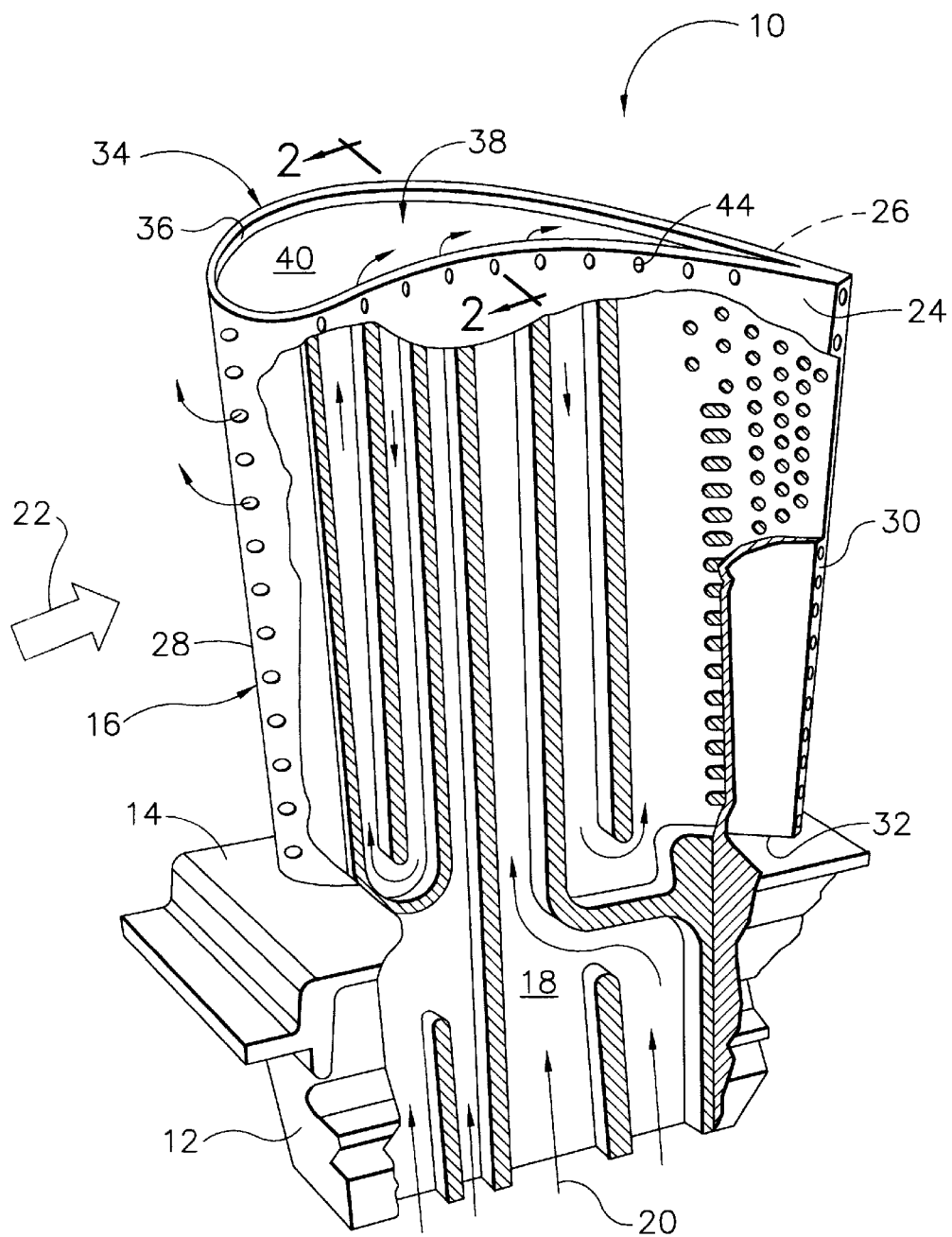
FIG. 1 is a partly sectional, isometric view of an exemplary gas turbine engine turbine rotor blade having an improved tip in accordance with an exemplary embodiment of the present invention.

Illustrated in FIG. 1 is an exemplary turbine rotor blade 10 for a gas turbine engine. The blade is one of many circumferentially spaced apart around the perimeter of a turbine rotor disk (not shown). Each blade includes a suitable dovetail 12 which retains the blade in a complementary dovetail slot formed in the perimeter of the disk. The blade has a radial or longitudinal axis, with an integral platform 14 and airfoil 16 disposed in turn radially above the dovetail.

The blade is typically cast in a unitary or one-piece component, and includes an internal flow channel or circuit 18 for channeling a coolant 20 therethrough. The flow channel 18 may have any conventional form, such as multipass serpentine channels, with the coolant 20 typically being a portion of air bled from the compressor of the engine.

During operation, air pressurized in the compressor is mixed with fuel and ignited in a combustor (not shown) for generating hot combustion gases 22 that flow over the airfoil 16 which extracts energy therefrom for rotating the rotor disk. The airfoil 16 includes a generally concave, first or pressure sidewall 24 spaced laterally or circumferentially in most part from a convex, second or suction sidewall 26. The sidewalls are joined together at axially opposite leading and trailing edges 28,30, and extend longitudinally or radially from a root 32 where the airfoil meets the platform to a radially outer tip 34.

The blade or airfoil tip includes a squealer tip rib 36 which is integrally disposed along the pressure and suction sidewalls 24,26 to define an open tip cavity 38 extending radially outwardly from a tip floor or cap 40. The tip cap 40 encloses the top of the flow channel 18 between the sidewalls.

In the preferred embodiment illustrated, the tip rib 36 extends from the perimeter of the tip cap 40 and is coextensive with the pressure and suction sidewalls 24,26 around the perimeter of the airfoil.

Figure 2:
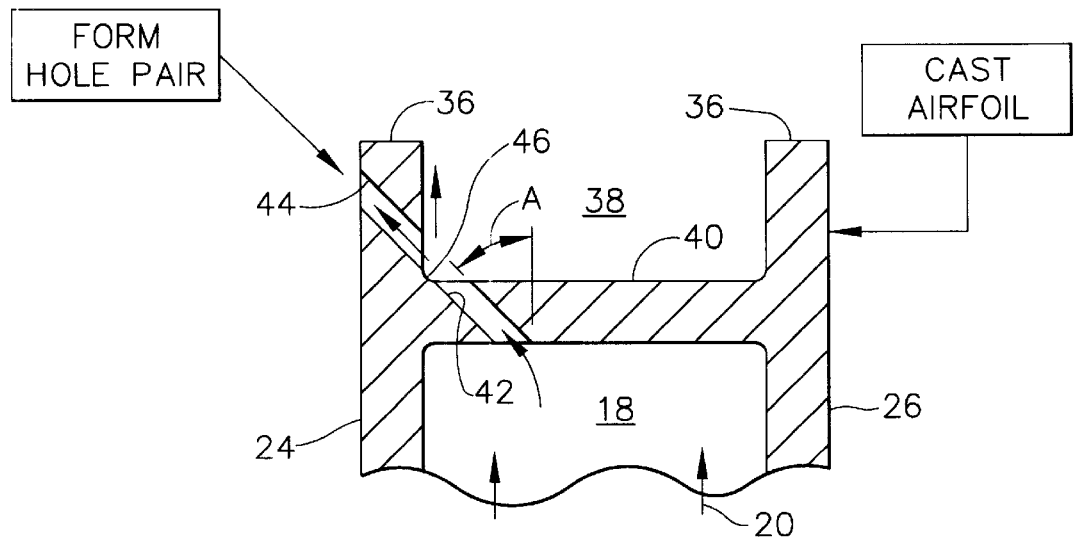
FIG. 2 is an elevational sectional view through the airfoil tip illustrated in FIG. 1 and taken along 2—2, showing aligned tip holes.

As illustrated in FIGS. 1 and 2, the airfoil tip includes a plurality of coaxially aligned pairs of first and second tip holes 42,44 extending through the tip cap 40 and tip rib 36, respectively. The hole pairs 42,44 are preferably disposed through the pressure-side portion of the tip rib 36 on the airfoil pressure sidewall 24, and are spaced apart between the leading and trailing edges for providing improved cooling along the pressure side of the tip.

The first and second tip holes in each pair are coaxially aligned with each other along a common hole axis in a serial or sequential arrangement. As shown in FIG. 2, the aligned pair of holes 42,44 are inclined together at a common acute inclination angle A, measured from the radial or longitudinal axis. In this way, the first hole 42 illustrated in FIG. 2 is disposed in flow communication with the internal flow channel 18 for discharging therefrom a portion of the coolant 20 toward the inner surface of the tip rib 36 for cooling thereof.

The hole pair 42,44 are inclined through the tip rib and cap and are interrupted at an inside corner 46 defined between the tip cap 40 and the adjoining tip rib 36. The position and inclination of the hole pair is preferably selected so that the outlet of the first hole 42 is directed at the base of the tip rib 36 where it forms the inside corner 46 with the tip cap 40. In this way, the coolant 20 may be discharged from the flow channel 18 at the inside base of the tip rib 36 for providing enhanced cooling thereof.

For example, a portion of the coolant discharged from the first hole 42 may impinge the inner surface of the tip rib 36 around the second hole 44 for providing impingement cooling thereof, while a portion of the discharged coolant also passes through the second hole 44 for internal convection cooling thereof, as well as film cooling upon leaving the second hole 44.

Figure 3:
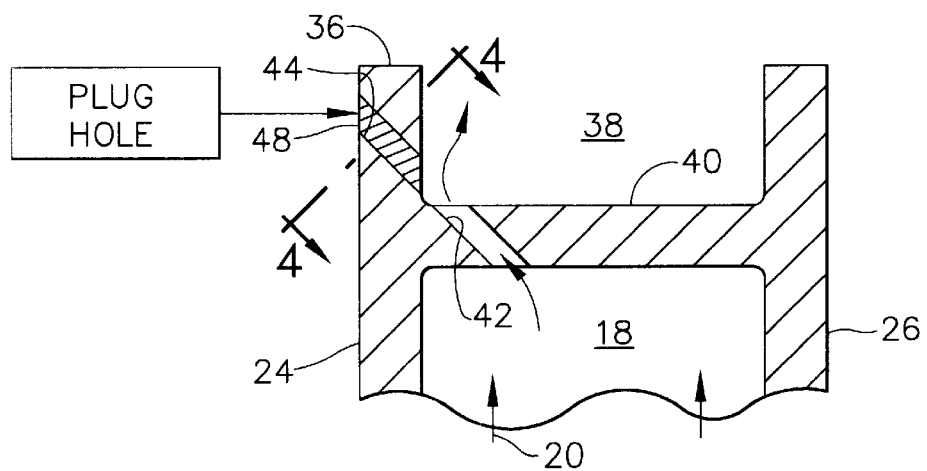
FIG. 3 is an elevational view, like FIG. 2, illustrating an alternate embodiment of the aligned tip holes.

FIG. 3 illustrates an alternate embodiment of the invention configured like the embodiment illustrated in FIG. 2, yet including a plug 48 disposed inside the second hole 44, while the first hole 42 remains empty. By plugging the second hole 44, the coolant discharged from the first hole 42 may fully impinge the inner surface of the tip rib 36 at and near the plug 44 for further enhancing cooling of the tip rib itself. The plug 48 is additionally shown in section in FIG. 4, and may be formed in any suitable manner such as by brazing or welding the initially empty second hole 44 using a suitable filler material.

In a preferred embodiment, the plug 48 has a different material composition than that of the tip rib 36 in which it is formed, with the plug 48 preferably having a greater, and relatively high, thermal conductivity than that of the tip rib 36. In this way, impingement cooling of the plug 48 may be used for extracting heat from the tip rib 36 during operation for further reducing its operating temperature to correspondingly increase useful blade life.

Figure 4:
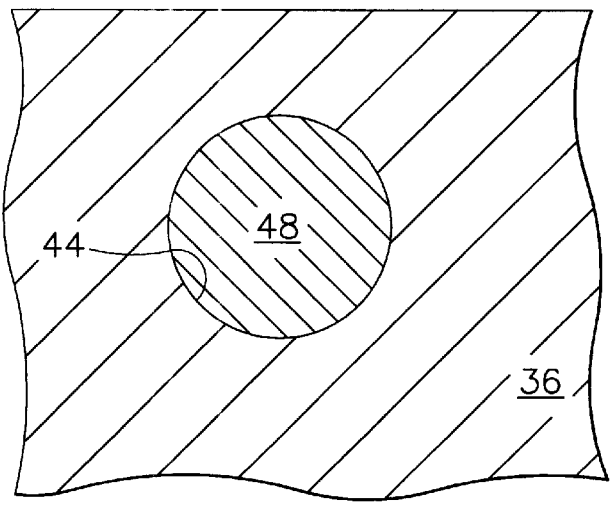

In the exemplary embodiment illustrated in FIGS. 3 and 4, the first and second holes 42,44 have the same cross sectional shape, such as round or circular, with the plug 48 completely filling the second hole 44 to form a round or cylindrical pin therein.

Figure 5:
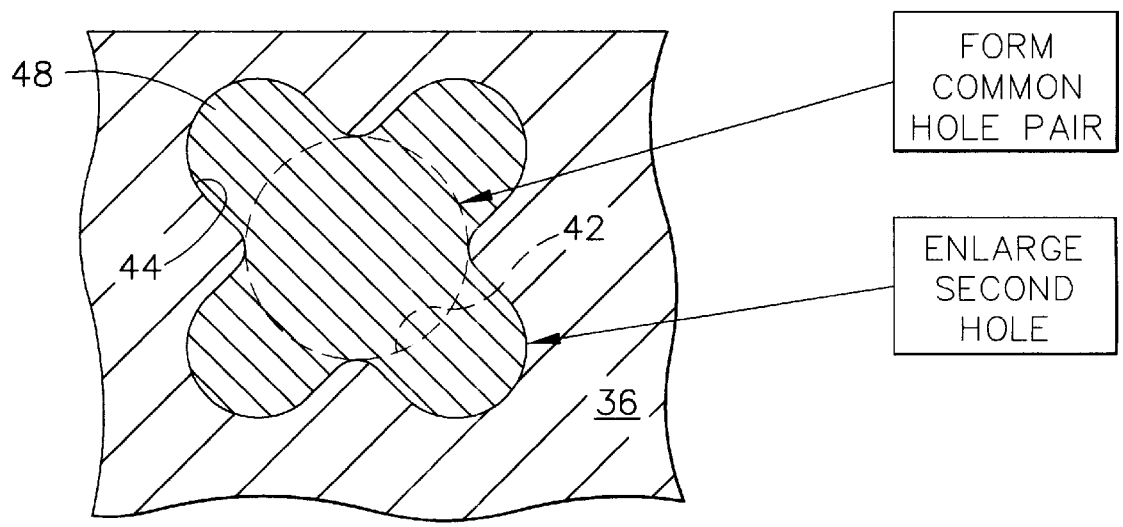
FIG. 5 is a cross sectional view, like FIG. 4, showing the plugged hole in accordance with an alternate embodiment of the invention.

FIG. 5 illustrates an alternate embodiment of the invention wherein the first and second holes 42,44 have different cross sectional shapes for further improving cooling of the tip rib.

More specifically, the second hole 44 preferably has a greater sectional perimeter or length than the first hole 42 with the latter preferably being round in cross section, and the former being preferably being lobed.

As shown in FIG. 5, the second hole 44 preferably includes a plurality of circumferentially adjoining lobes of suitable number including two or more, or the four illustrated. Preferably two of the lobes of the second hole 44 are disposed longitudinally or radially symmetrically in the tip rib 36, and diverge away from each other from the underlying tip cap 40.

Correspondingly, the plug 48 has complementary lobes which cooperate with the coolant which impinges against the inside surface of the plug during operation. As the coolant impinges on the plug, impingement cooling is provided, and a film of cooling air is formed as the air flows along the inner surface of the tip rib along the diverging lobes.

Since the first and second tip holes 42,44 are relatively small in diameter, with an exemplary nominal diameter of about 15–20 mils (0.38–0.5 mm), they are preferably formed after the initial casting of the blade itself.

As shown in FIG. 2, the blade, including its airfoil, is initially formed by casting in any conventional manner, followed in turn by suitably forming the several hole pairs 42,44 through the cast tip rib 36 and tip cap 40. Each hold pair is preferably formed in a single operation by drilling using a laser, electrical discharge machine, or water jet, for example.

Since the first hole 42 illustrated in FIG. 2 is inclined and hidden behind the pressure side tip rib 36, that hole may be formed only after the second hole 44 is formed through the tip rib. A common drilling operation may therefore be used to form in turn the second hole 44 followed by the first hole 42 for providing flow communication therethrough from the flow channel 18 to the outer surface of the tip rib 36.

As shown in FIG. 3, the second hole 44 may then be plugged in any suitable manner such as by brazing or welding using a suitable filler material. Alternatively, the plug 48 may be preformed as a pin which itself is brazed in the second hole 44, or otherwise affixed therein.

As indicated above, the lobed embodiment of the second hole 44 illustrated in FIG. 5 effects a cross section with a high perimeter to area ratio for enhancing cooling effectiveness of the impingement air. The differently configured first and second holes 42,44 may correspondingly be formed by first forming a common hole through both the tip rib 36 and cap, such as a round hole. The second hole 44 in the tip rib 36 may then be finally formed by enlarging the initially formed round hole greater in size than the first hole 42, with a suitable configuration or profile such as the lobed profile illustrated in FIG. 5. The lobed profile of the second hole 44 may be obtained by using a correspondingly configured electrical discharge machining electrode, for example. The first tip holes 42 described above are effective for impinging the coolant against the inner surface of the tip rib 36 for providing enhanced cooling thereof. The impingement air is protected by the tip rib 36 and is not directly subjected to the hot combustion gases surrounding the outer surface of the tip rib. Impingement cooling provides a greater amount of cooling than simple film cooling or convection cooling alone. Accordingly, the airfoil tip enjoys enhanced cooling for increased life during operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine airfoil comprising:
   pressure and suction sidewalls joined together at leading and trailing edges, and extending from a root to tip;
   said tip including a tip rib disposed along said sidewalls to define a tip cavity extending from a tip cap enclosing an internal flow channel between said sidewalls; and
   an aligned pair of first and second holes extending through said tip cap and rib, respectively, at an acute inclination angle, with said first hole being disposed in flow communication with said flow channel for discharging therefrom a coolant toward an inner surface of said tip rib for cooling thereof.

2. An airfoil according to claim 1 wherein said first and second holes are interrupted at an inside corner between said tip cap and rib.

3. An airfoil according to claim 2 further comprising a plug disposed inside said second hole for receiving in impingement said coolant from said first hole.

4. An airfoil according to claim 3 wherein said plug has a different material composition than said tip rib.

5. An airfoil according to claim 4 wherein said plug has a greater thermal conductivity than said tip rib.

6. An airfoil according to claim 4 wherein said first and second holes have the same cross sectional shape.

7. An airfoil according to claim 4 wherein said first and second holes have different cross sectional shapes.

8. An airfoil according to claim 7 wherein said second hole has a greater sectional perimeter than said first hole.

9. An airfoil according to claim 7 wherein said first hole is round, and said second hole is lobed.

10. An airfoil according to claim 9 wherein said second hole includes a plurality of circumferentially adjoining lobes.

11. An airfoil according to claim 10 wherein two of said lobes are disposed longitudinally symmetrically in said tip rib, and diverge from said tip cap.

12. An airfoil according to claim 4 further comprising a plurality of said hole pairs disposed on said pressure sidewall and tip cap, and spaced apart between said leading and trailing edges.

13. A method of forming said airfoil according to claim 2 comprising:

casting said airfoil; and forming said hole pair through said tip rib and cap.

14. A method according to claim 13 further comprising plugging said second hole in said tip rib.

15. A method according to claim 14 wherein said hole pair are formed by:

forming a common hole through both said tip rib and cap; and enlarging said hole through said tip rib greater in size than said hole through said tip cap.

16. A turbine blade tip comprising a rib extending from a perimeter of a cap to define a tip cavity, and including an aligned pair of first and second holes extending through said tip cap and rib, respectively.

17. A blade tip according to claim 16 wherein said hole pair are inclined through said tip rib and cap, and are interrupted at an inside corner therebetween.

18. A blade tip according to claim 17 further comprising a plug disposed inside said second hole.

19. A blade tip according to claim 18 wherein said plug has a different material composition than said tip rib.

20. A blade tip according to claim 19 wherein said first and second holes have different cross sectional shapes.

* * * * *